United States Patent
Cui

(10) Patent No.: US 10,068,364 B2
(45) Date of Patent: Sep. 4, 2018

(54) METHOD AND APPARATUS FOR MAKING PERSONALIZED DYNAMIC EMOTICON

(71) Applicant: Tencent Technology (Shenzhen) Company Limited, Shenzhen, Guangdong (CN)

(72) Inventor: Yingren Cui, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 114 days.

(21) Appl. No.: 15/212,904

(22) Filed: Jul. 18, 2016

(65) Prior Publication Data

US 2016/0328877 A1    Nov. 10, 2016

Related U.S. Application Data

(63) Continuation of application No. PCT/CN2015/073983, filed on Mar. 11, 2015.

(30) Foreign Application Priority Data

Mar. 13, 2014  (CN) .......................... 2014 1 0093597

(51) Int. Cl.
*G06T 13/80* (2011.01)
*G06T 3/40* (2006.01)
(Continued)

(52) U.S. Cl.
CPC ............ *G06T 13/80* (2013.01); *G06F 3/0482* (2013.01); *G06F 3/04817* (2013.01);
(Continued)

(58) Field of Classification Search
CPC ......... G06T 13/80; G06T 3/40; G06T 1/0007; G06T 2200/24; G06T 2207/10016;
(Continued)

(56) References Cited

U.S. PATENT DOCUMENTS

| 2006/0119597 | A1 | 6/2006 | Oshino |
| 2008/0178086 | A1 | 7/2008 | Zhang et al. |

(Continued)

FOREIGN PATENT DOCUMENTS

| CN | 101179688 A | 5/2008 |
| CN | 101589618 A | 11/2008 |
| CN | 101599017 A | 12/2009 |
| CN | 102368196 A | 3/2012 |
| WO | WO2015/135472 A1 | 9/2015 |

OTHER PUBLICATIONS

International Search Report and Written Opinion received in PCT Application No. PCT/CN2015/073983 dated Jun. 3, 2015.

*Primary Examiner* — Saptarshi Mazumder
(74) *Attorney, Agent, or Firm* — Brinks Gilson & Lione

(57) ABSTRACT

The present disclosure discloses a method and an apparatus for making a personalized dynamic emoticon. The method includes: acquiring a video; receiving a picture selection instruction input from a user interface (UI) for making dynamic emoticons; determining, from the acquired video according to the picture selection instruction, multiple frames of images for making a dynamic emoticon; and synthesizing the multiple frames of images for making the dynamic emoticon, to form a picture having a dynamic effect.

12 Claims, 6 Drawing Sheets

(51) Int. Cl.
  *H04L 12/58* (2006.01)
  *G06F 3/0481* (2013.01)
  *G06F 3/0482* (2013.01)
  *G06F 3/0484* (2013.01)
  *G06T 1/00* (2006.01)

(52) U.S. Cl.
  CPC ........ *G06F 3/04845* (2013.01); *G06T 1/0007* (2013.01); *G06T 3/40* (2013.01); *H04L 51/10* (2013.01); *G06T 2200/24* (2013.01); *G06T 2207/10016* (2013.01)

(58) Field of Classification Search
  CPC ............... G06F 3/04817; G06F 3/0482; G06F 3/04845; G06F 3/04847; G06F 17/30852; G06F 3/0485; G06F 3/0484; H04L 51/10
  See application file for complete search history.

(56) References Cited

U.S. PATENT DOCUMENTS

| | | | | |
|---|---|---|---|---|
| 2009/0172543 | A1* | 7/2009 | Cronin | G06F 3/04847 715/721 |
| 2010/0281380 | A1* | 11/2010 | Langmacher | G06F 3/04847 715/723 |
| 2012/0057845 | A1* | 3/2012 | Obana | G06F 17/30244 386/241 |
| 2014/0092101 | A1* | 4/2014 | Lee | G06T 13/80 345/473 |
| 2015/0054985 | A1* | 2/2015 | Baek | H04N 5/23293 348/231.99 |
| 2016/0103830 | A1* | 4/2016 | Cheong | G06F 3/0488 715/738 |

* cited by examiner

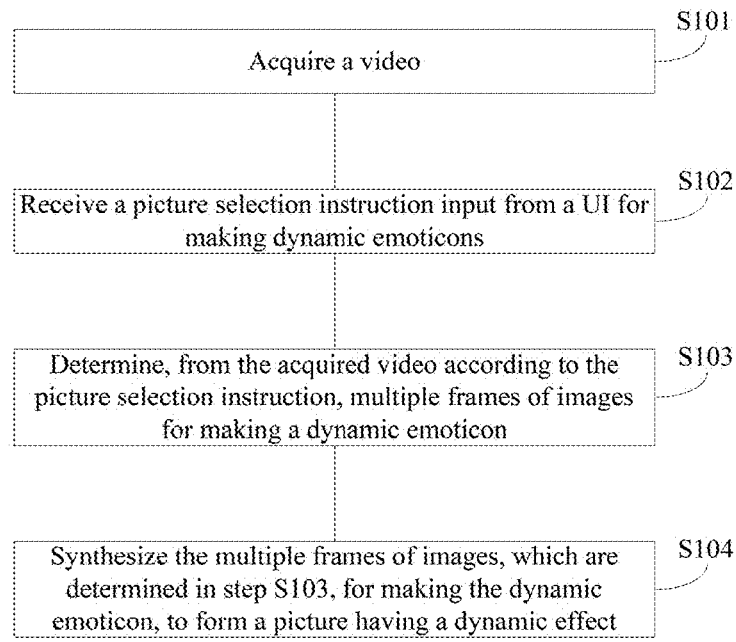
FIG. 1-a
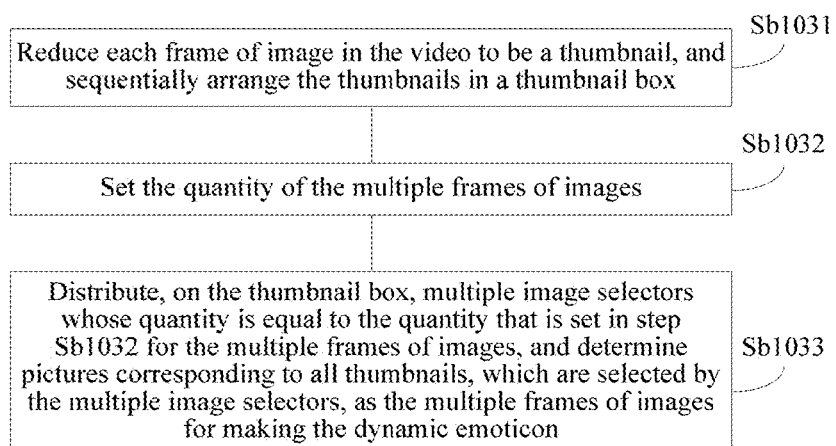
FIG. 1-b

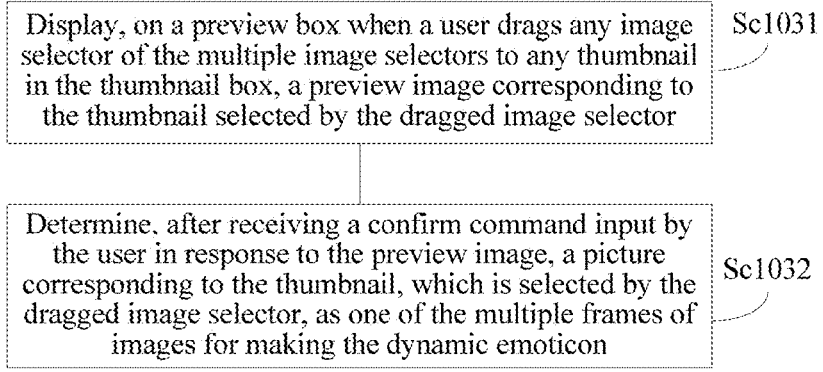
FIG. 1-c
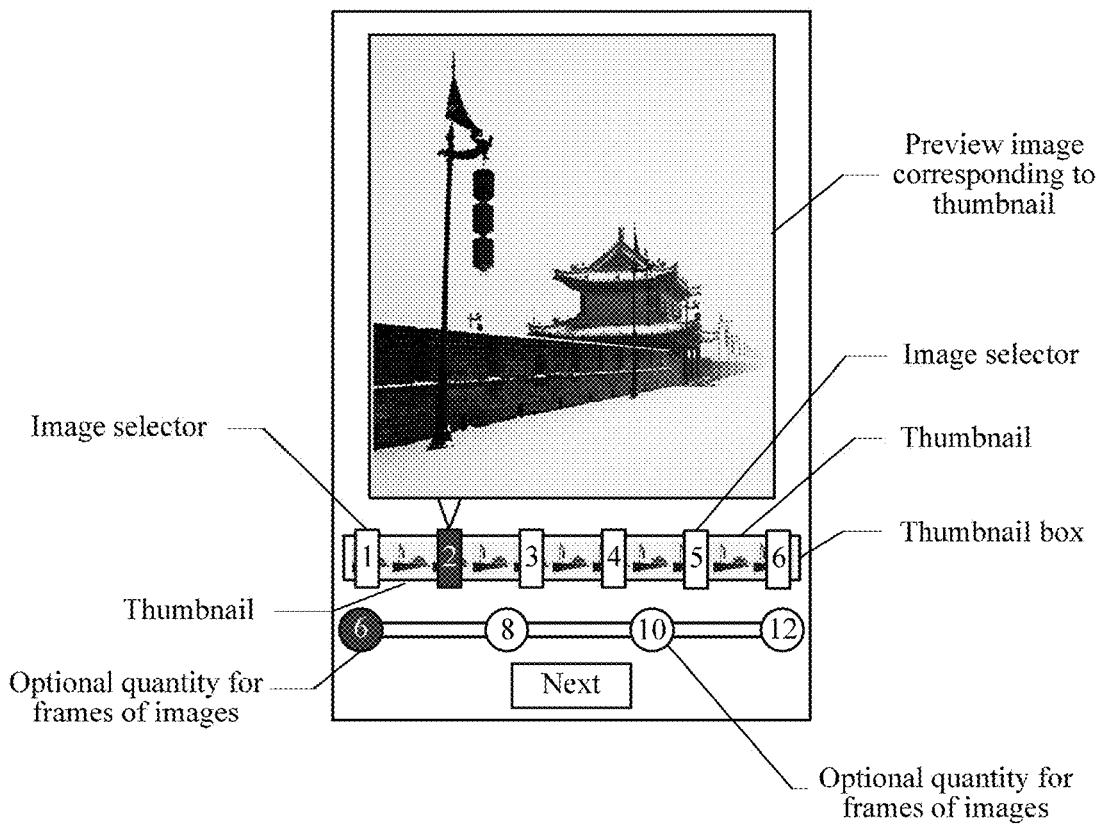
FIG. 2

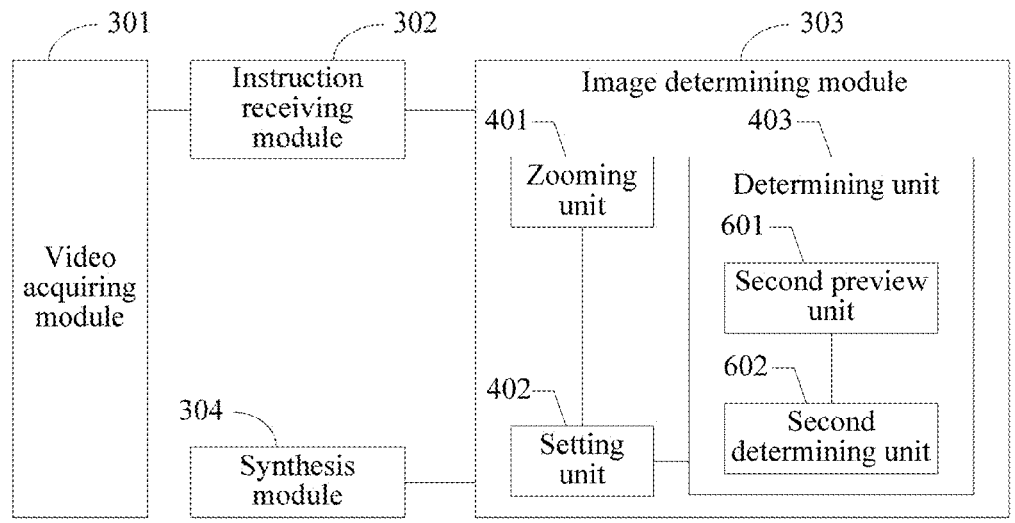
FIG. 6
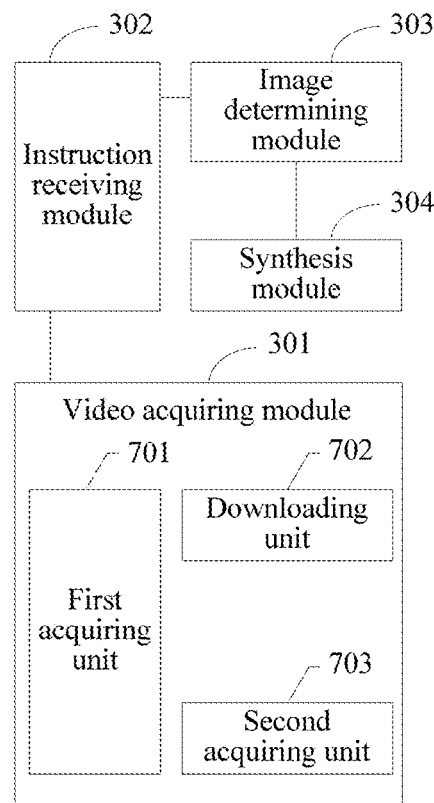
FIG. 7-a

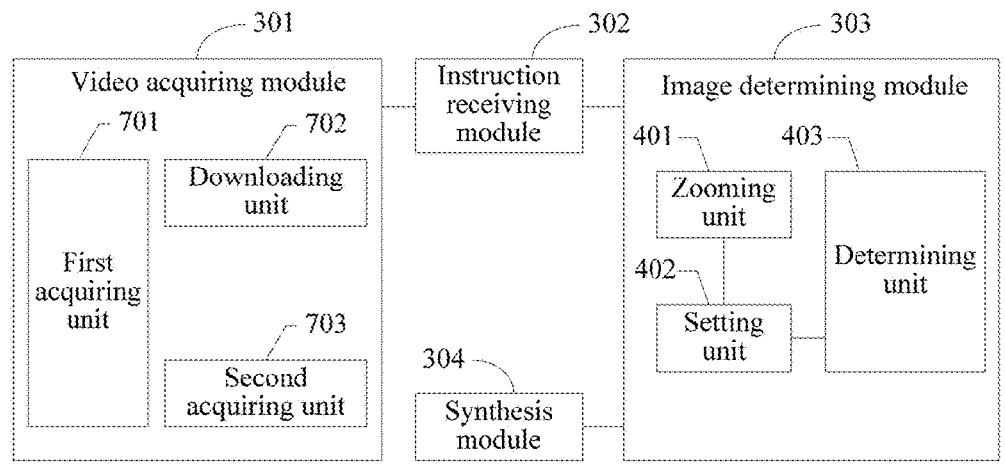
FIG. 7-b
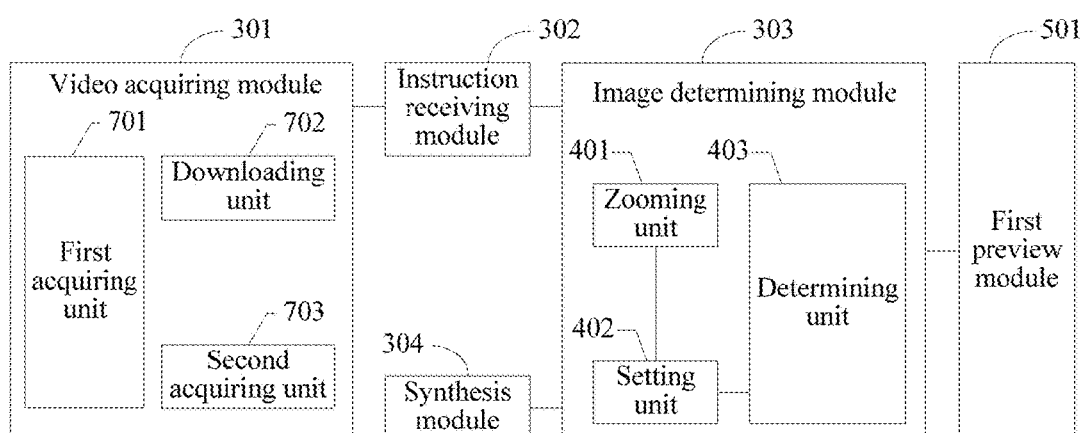
FIG. 7-c

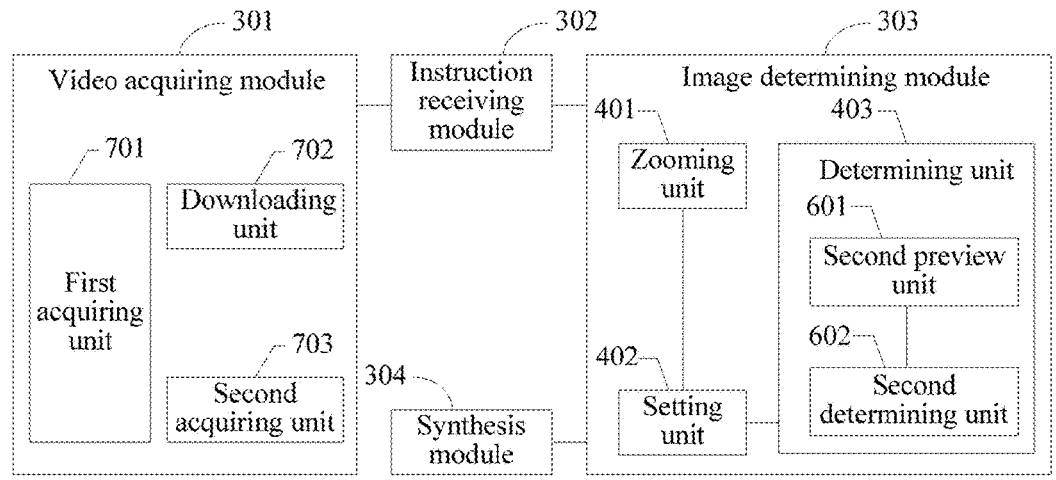
FIG. 7-d
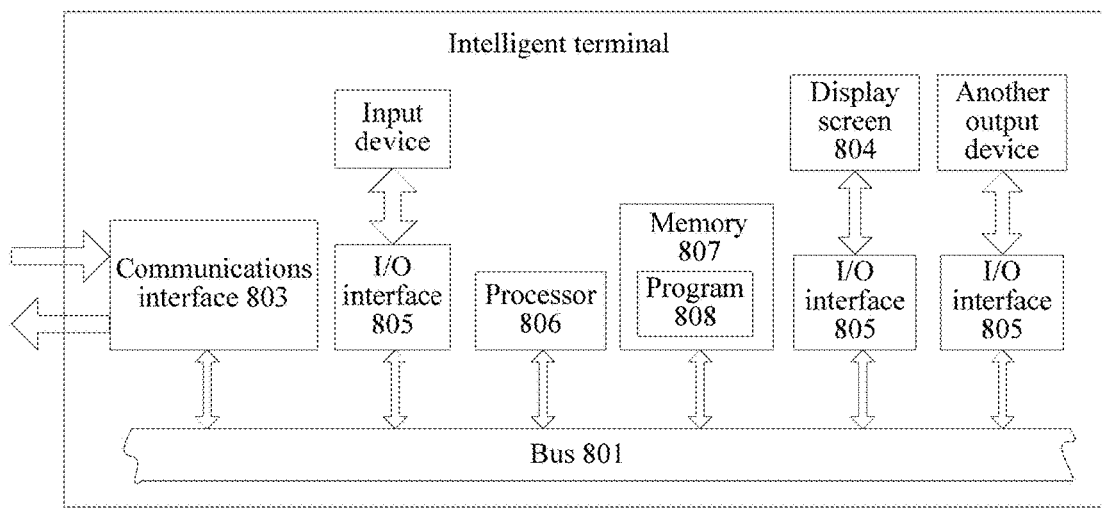
FIG. 8

US 10,068,364 B2

METHOD AND APPARATUS FOR MAKING PERSONALIZED DYNAMIC EMOTICON

CROSS-REFERENCE TO RELATED APPLICATIONS

This application is a continuation of International Application No. PCT/CN2015/073983, filed on Mar. 11, 2015, which claims the priority to Chinese Patent Application No. 201410093597.9, filed on Mar. 13, 2014, both of which are incorporated herein by reference in their entirety.

FIELD OF THE TECHNOLOGY

The present disclosure relates to the field of computer technologies, and in particular, to a method and an apparatus for making a personalized dynamic emoticon.

BACKGROUND OF THE DISCLOSURE

Instant Messaging (IM) is a terminal service that allows two or more users to transmit text information and documents and perform audio and video communication in real time over a network. The IM is classified into enterprise IM and website IM according to different purposes, and may also be classified into mobile phone IM and personal computer (PC) IM according to different objects where the IM is installed.

With the continuous development of Internet technologies, text information transmitted in IM is no longer limited to conventional texts. The emoticon language transmitted in IM is a language different from conventional texts. This language uses expressions shown by cartoon pictures to represent information of a corresponding literal expression, for example, a grin on a cartoon picture represents information of the literal expression "grin", and for another example, the action of laughing while covering the mouth with a hand on a cartoon picture represents information of the literal expression "snicker". With enhanced aesthetic judgment and more demanding personalized requirement, users are no longer satisfied with the static emoticon language. Therefore, a new language called dynamic emoticon came into being. The dynamic emoticon has a similar function as the emoticon language described above, and is also pictures or icons for expressing feelings and emotions, and the difference lies in that the dynamic emoticon has a dynamic effect.

There are many methods for providing dynamic emoticons for IM clients in the field, and one method provided in the existing technology is to provide a dynamic emoticon package that contains a certain number of dynamic emoticons for a client. When an IM user needs a dynamic emoticon, the user selects a dynamic emoticon from the dynamic emoticon package to express the mood or feeling of the user at the moment.

Although the existing technology described above can provide dynamic emoticons for IM users, the dynamic emoticon package provided by a business includes fixed content and a limited number of emoticons, which limits the personalized requirements of IM users.

SUMMARY

An embodiment of the present invention provides a method for making a personalized dynamic emoticon, the method including:

acquiring a video;

receiving a picture selection instruction input from a user interface (UI) for making dynamic emoticons;

determining, from the acquired video according to the picture selection instruction, multiple frames of images for making a dynamic emoticon; and synthesizing the multiple frames of images for making the dynamic emoticon, to form a picture having a dynamic effect.

Another embodiment of the present invention provides an apparatus for making a personalized dynamic emoticon, the apparatus including:

a video acquiring module, configured to acquire a video;

an instruction receiving module, configured to receive a picture selection instruction input from a UI for making dynamic emoticons;

an image determining module, configured to determine, from the acquired video according to the picture selection instruction, multiple frames of images for making a dynamic emoticon; and a synthesis module, configured to synthesize the multiple frames of images for making the dynamic emoticon, to form a picture having a dynamic effect.

BRIEF DESCRIPTION OF THE DRAWINGS

FIG. 1-a is a schematic diagram of a basic process of a method for making a personalized dynamic emoticon according to an embodiment of the present invention;

FIG. 1-b is a schematic diagram of a basic process of determining, from the acquired video according to the picture selection instruction, multiple frames of images for making a dynamic emoticon according to an embodiment of the present invention;

FIG. 1-c is a schematic diagram of a basic process of determining pictures corresponding to all thumbnails, which are selected by the multiple image selectors, as the multiple frames of images for making the dynamic emoticon according to an embodiment of the present invention;

FIG. 2 is a schematic diagram of determining, from the acquired video, multiple frames of images for making a dynamic emoticon according to an embodiment of the present invention;

FIG. 6 is a logic schematic structural diagram of an apparatus for making a personalized dynamic emoticon according to another embodiment of the present invention;

FIG. 7-a is a logic schematic structural diagram of an apparatus for making a personalized dynamic emoticon according to another embodiment of the present invention;

FIG. 7-b is a logic schematic structural diagram of an apparatus for making a personalized dynamic emoticon according to another embodiment of the present invention;

FIG. 7-c is a logic schematic structural diagram of an apparatus for making a personalized dynamic emoticon according to another embodiment of the present invention;

FIG. 7-d is a logic schematic structural diagram of an apparatus for making a personalized dynamic emoticon according to another embodiment of the present invention; and FIG. 8 is a schematic structural diagram of an intelligent terminal according to an embodiment of the present invention.

DESCRIPTION OF EMBODIMENTS

Figure 3:
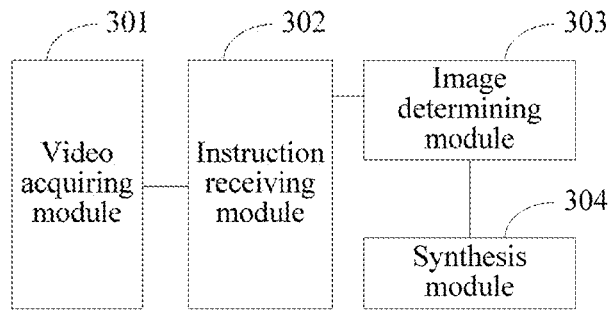
FIG. 3 is a logic schematic structural diagram of an apparatus for making a personalized dynamic emoticon according to an embodiment of the present invention.

The embodiments of the present invention provide a method for making a personalized dynamic emoticon. The method includes: acquiring a video; receiving a picture selection instruction input from a UI for making dynamic emoticons; determining, from the acquired video according to the picture selection instruction, multiple frames of images for making a dynamic emoticon; and synthesizing the multiple frames of images for making the dynamic emoticon, to form a picture having a dynamic effect. The embodiments of the present invention further provide a corresponding apparatus for making a personalized dynamic emoticon. The method and the apparatus are separately described in the following.

The method for making a personalized dynamic emoticon according to an embodiment of the present invention is applicable to various IM software. For a basic process of the method for making a personalized dynamic emoticon provided by this embodiment of the present invention, reference may be made to FIG. 1-a; the basic process mainly includes step S101 to step S104, which are described in detail as follows:

S101: Acquire a video.

In this embodiment of the present invention, a video for making a dynamic emoticon may be acquired in advance, where the video may be acquired from a video file already saved in the local folder, or the video may be downloaded from a server or a carrier, or the video may be acquired by shooting a real-time video of a real object with an image shooting device; this embodiment of the present invention does not limit the manner for acquiring the video.

S102: Receive a picture selection instruction input from a UI for making dynamic emoticons.

The picture selection instruction input from the UI for making dynamic emoticons may be that a user clicks a "dynamic emoticon" button provided by the UI of IM software; when the user clicks the button, it indicates that the user starts making a dynamic emoticon. When the user clicks the "dynamic emoticon" button on the UI of the IM software, a system receives the picture selection instruction of the user.

S103: Determine, from the acquired video according to the picture selection instruction, multiple frames of images for making a dynamic emoticon.

In the method provided by this embodiment of the present invention, multiple frames of images for making a dynamic emoticon come from an acquired video, which is different from the existing technology that can only provide fixed-content dynamic emoticons; therefore, the method of this embodiment of the present invention can make dynamic emoticons that are rich in content and highly personalized according to user requirements.

As an embodiment of the present invention, the process of determining, from the acquired video according to the picture selection instruction, multiple frames of images for making a dynamic emoticon is shown in FIG. 1-b, and includes the following step Sb1031 to step Sb1033.

Sb1031: Reduce each frame of image in the video to be a thumbnail, and sequentially arrange the thumbnails in a thumbnail box.

A video is essentially a group of static pictures, that is, a video actually consists of frames of static pictures, and when a player plays more than 24 frames of static pictures per second, human eyes recognize these static pictures as continuous images, namely, a video. According to the foregoing principle of the video, in this embodiment of the present invention, each frame of image in the video may be reduced to be a thumbnail, and then the thumbnails are sequentially arranged in a thumbnail box, as shown in FIG. 2.

Sb1032: Set the quantity of the multiple frames of images.

The number on the horizontal bar below the thumbnail box shown in FIG. 2 represents the quantity that the user can set for the multiple frames of images, for example, 6, 8, 12, or 14. When the user clicks the number on the horizontal bar, it indicates that the user sets the quantity for the corresponding multiple frames of images, and the system accepts the quantity set by the user for the multiple frames of images.

Sb1033: Distribute, on the thumbnail box, multiple image selectors whose quantity is equal to the quantity that is set in step Sb1032 for the multiple frames of images, and determine pictures corresponding to all thumbnails, which are selected by the multiple image selectors, as the multiple frames of images for making the dynamic emoticon.

As shown in FIG. 2, after the user sets the quantity of the multiple frames of images, multiple image selectors whose quantity is equal to the quantity set in step Sb1032 for the multiple frames of images are distributed on the thumbnail box. For example, if the user sets 6 frames of images in step Sb1032, 6 image selectors are distributed on the thumbnail box, and the system determines pictures corresponding to all thumbnails, which are selected by the 6 image selectors, as the multiple frames of images for making the dynamic emoticon.

To help the user select satisfactory images from many pictures of the video, in an embodiment of the present invention, before multiple image selectors whose quantity is the same as the quantity set in step Sb1032 for the multiple frames of images are distributed on the thumbnail box, and pictures corresponding to all thumbnails covered by the multiple image selectors are determined as the multiple frames of images for making the dynamic emoticon, when the user navigates to any image selector of the multiple image selectors distributed on the thumbnail box, a preview image corresponding to the thumbnail selected by the image selector is displayed in on a corresponding preview box, to be previewed by the user, so that the user determines whether to use the picture. For example, in FIG. 2, 6 image selectors, namely image selector 1 to image selector 6, are distributed on the thumbnail box (where the 6 image selectors may be distributed uniformly), and after the user navigates to image selector 1 in the thumbnail box, the system displays, in the preview box, the picture corresponding to the thumbnail selected by image selector 1. Through the preview box, the user can clearly see the picture corresponding to the thumbnail selected by image selector 1, thereby determining whether to use the picture.

In the foregoing example, once the quantity of image selectors is set according to the quantity of the multiple frames of images, these image selectors are distributed on the thumbnail box, or uniformly distributed on the thumbnail box in a default manner. In fact, the image selectors can be dragged, that is, in an embodiment of the present invention, the process of distributing, on a thumbnail box, multiple image selectors whose quantity is equal to the quantity that is set in step Sb1032 for the multiple frames of images, and determining pictures corresponding to all thumbnails, which are selected by the multiple image selectors, as the multiple frames of images for making the dynamic emoticon is shown in FIG. 1-c, and includes step Sc1031 to step Sc1032:

Sc1031: Display, on a preview box when a user drags any image selector of the multiple image selectors to any thumbnail in the thumbnail box, a preview image corresponding to the thumbnail selected by the dragged image selector.

Similar to the embodiment described above, the purpose of displaying, on the preview box, the preview image corresponding to the thumbnail selected by the dragged image selector is to help the user see the selected picture clearly beforehand, so as to determine whether to use the picture.

Sc1032: Determine, after receiving a confirm command input by the user in response to the preview image, a picture corresponding to the thumbnail, which is selected by the dragged image selector, as one of the multiple frames of images for making the dynamic emoticon.

S104: Synthesize the multiple frames of images, which are determined in step S103, for making the dynamic emoticon, to form a picture having a dynamic effect.

In this embodiment of the present invention, the multiple frames of images, which are determined in step S103, for making the dynamic emoticon are synthesized into a picture having a dynamic effect, where the format of the picture may be gif.

It can be learned from the method for making a personalized dynamic emoticon provided in the foregoing embodiment of the present invention that, multiple frames of images for making a dynamic emoticon come from an acquired video; the video may be from a lot of sources and is rich in content, and moreover, any frame of picture in the video may be selected. Therefore, compared with the existing technology in which dynamic emoticons provided by a business have fixed content and are limited in quantity, on one hand, the method provided by this embodiment of the present invention can help a user make an unlimited quantity of dynamic emoticons of varied content so as to meet a personalized requirement of the user, and on the other hand, the method for making a dynamic emoticon is simple, convenient, and efficient, and can be used by all kinds of people.

The following describes an apparatus for making a personalized dynamic emoticon which is according to an embodiment of the present invention and used to execute the foregoing method for making a personalized dynamic emoticon; refer to FIG. 3 for a basic logic structure of the apparatus. For ease of description, FIG. 3 only shows parts related to this embodiment of the present invention. The apparatus for making a personalized dynamic emoticon shown in FIG. 3 may be a terminal or some functional module in a terminal, for example, the terminal may be a smart phone, or some functional module in a terminal may be some functional module in the smart phone. The apparatus for making a personalized dynamic emoticon shown in FIG. 3 includes a video acquiring module 301, an instruction receiving module 302, an image determining module 303, and a synthesis module 304.

The video acquiring module 301 is configured to acquire a video.

The instruction receiving module 302 is configured to receive a picture selection instruction input from a UI for making dynamic emoticons.

The picture selection instruction input from the UI for making dynamic emoticons may be that a user clicks a "dynamic emoticon" button provided by the UI of IM software; when the user clicks the button, it indicates that the user starts making a dynamic emoticon. When the user clicks the "dynamic emoticon" button on the UI of the IM software, the instruction receiving module 302 receives the picture selection instruction of the user.

The image determining module 303 is configured to determine, according to the picture selection instruction received by the instruction receiving module 302, multiple frames of images for making a dynamic emoticon from the acquired video.

In the apparatus for making a dynamic emoticon provided by this embodiment of the present invention, multiple frames of images for making a dynamic emoticon come from an acquired video, which is different from the existing technology that can only provide fixed-content dynamic emoticons; therefore, the apparatus of this embodiment of the present invention can make dynamic emoticons that are rich in content and highly personalized according to user requirements.

The synthesis module 304 is configured to synthesize the multiple frames of images for making the dynamic emoticon, which are determined by the image determining module 303, to form a picture having a dynamic effect.

In this embodiment of the present invention, the synthesis module 304 synthesizes the multiple frames of images for making the dynamic emoticon, which are determined by the image determining module 303, to form a picture having a dynamic effect, where the format of the picture may be gif.

It should be noted that, in the foregoing implementation manner of the apparatus for making a personalized dynamic emoticon shown in FIG. 3, the division of the modules is merely an example for description, and in an actual application, the foregoing functions may be completed by different functional modules according to a requirement such as a configuration requirement of corresponding hardware or requirement on convenience of software implementation, that is, the internal structure of the apparatus for making a personalized dynamic emoticon is divided into different modules, so as to complete all or some functions described above. Moreover, in an actual application, corresponding functional modules in this embodiment may be implemented by corresponding hardware, or by corresponding hardware executing corresponding software. For example, the foregoing image determining module may be hardware such as an image determiner that has a function of determining, from the acquired video according to the picture selection instruction received by the (or an instruction receiver), multiple frames of images for making a dynamic emoticon, and may also be a general-purpose processor or another other hardware device capable of executing a corresponding computer program to complete the foregoing function; for another example, the foregoing synthesis module may be hardware such as a synthesizer that has a function of synthesizing the multiple frames of images for making the dynamic emoticon, which are determined by the image determining module (or the image determiner), to form a picture having a dynamic effect, and may also be a general-purpose processor or another hardware device capable of executing a corresponding computer instruction to complete the foregoing function (the foregoing description principle is applicable to all the embodiments provided in the specification).

Figure 4:
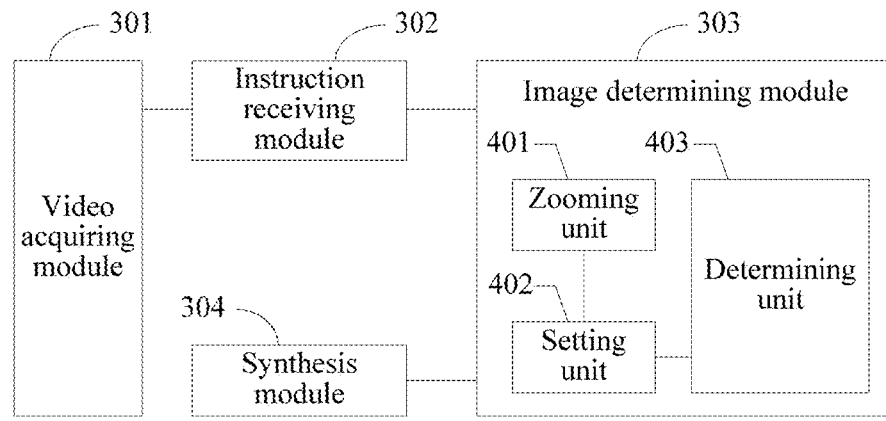
FIG. 4 is a logic schematic structural diagram of an apparatus for making a personalized dynamic emoticon according to another embodiment of the present invention.

The image determining module 303 shown in FIG. 3 may include a zooming unit 401, a setting unit 402, and a determining unit 403, as shown in FIG. 4, which is an apparatus for making a personalized dynamic emoticon according to another embodiment of the present invention.

The zooming unit 401 is configured to reduce each frame of image in the video to be a thumbnail, and sequentially arrange the thumbnails in a thumbnail box.

A video is essentially a group of static pictures, that is, a video actually consists of frames of static pictures, and when a player plays more than 24 frames of static pictures per second, human eyes recognize these static pictures as continuous images, namely, a video. According to the foregoing principle of the video, in this embodiment of the present invention, the zooming unit 401 may reduce each frame of image in the video to be a thumbnail, and then sequentially arrange the thumbnails in a thumbnail box, as shown in FIG. 2.

The setting unit 402 is configured to set the quantity of the multiple frames of images.

The number on the horizontal bar below the thumbnail box shown in FIG. 2 represents the quantity that the user can set for the multiple frames of images, for example, 6, 8, 12, or 14. When the user clicks the number on the horizontal bar, it indicates that the user sets the quantity for the corresponding multiple frames of images, and the setting unit 402 sets the quantity of the multiple frames of images.

The determining unit 403 is configured to distribute, on the thumbnail box, multiple image selectors whose quantity is equal to the set quantity, and determine pictures corresponding to all thumbnails, which are selected by the multiple image selectors, as the multiple frames of images for making the dynamic emoticon.

As shown in FIG. 2, after the user sets the quantity of the multiple frames of images, multiple image selectors whose quantity is equal to the quantity set by the setting unit 402 for the multiple frames of images are distributed on the thumbnail box. For example, if in the setting unit 402, the user sets 6 frames of images, 6 image selectors are distributed on the thumbnail box, and the determining unit 403 determines pictures corresponding to all thumbnails, which are selected by the 6 image selectors, as the multiple frames of images for making the dynamic emoticon.

Figure 5:
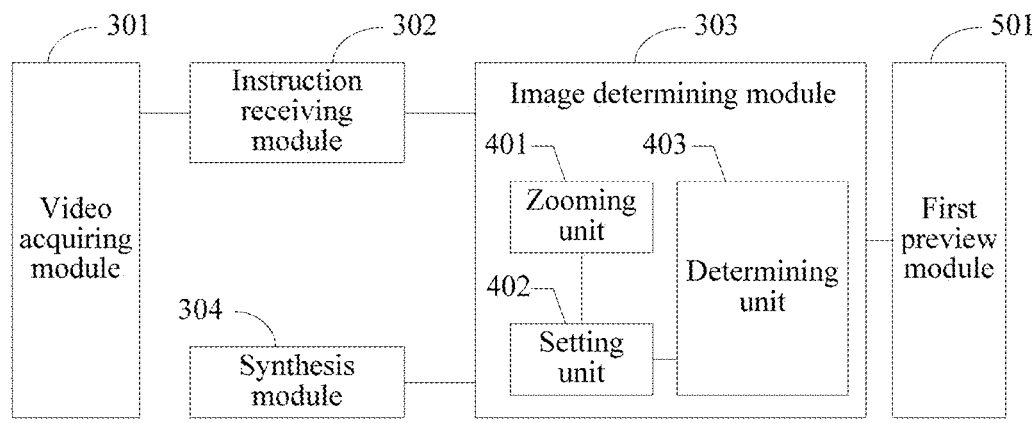
FIG. 5 is a logic schematic structural diagram of an apparatus for making a personalized dynamic emoticon according to another embodiment of the present invention.

The apparatus for making a personalized dynamic emoticon shown in FIG. 4 may further include a first preview module 501, as shown in FIG. 5, which is an apparatus for making a personalized dynamic emoticon according to another embodiment of the present invention. The first preview module 501 is configured to display, on a preview box when a user navigates to any image selector of the multiple image selectors distributed on the thumbnail box, a preview image corresponding to a thumbnail selected by the image selector, to be viewed by the user, so that the user determines whether to use the picture. For example, in FIG. 2, 6 image selectors, namely image selector 1 to image selector 6, are distributed on the thumbnail box (where the 6 image selectors may be distributed uniformly), and after the user navigates to image selector 1 in the thumbnail box, the first preview module 501 displays, in the preview box, the picture corresponding to the thumbnail selected by image selector 1. Through the preview box, the user can clearly see the picture corresponding to the thumbnail selected by image selector 1, thereby determining whether to use the picture.

In the foregoing apparatus for making a personalized dynamic emoticon shown in FIG. 5, once the quantity of image selectors is set according to the quantity of the multiple frames of images, these image selectors are distributed on the thumbnail box, or uniformly distributed on the thumbnail box in a default manner. Actually, the image selectors can be dragged, that is, the determining unit 403 shown in FIG. 4 may include a second preview unit 601 and a second determining unit 602, as shown in FIG. 6, which is an apparatus for making a personalized dynamic emoticon according to another embodiment of the present invention.

The second preview unit 601 is configured to display, on a preview box when a user drags any image selector of the multiple image selectors to any thumbnail in the thumbnail box, a preview image corresponding to the thumbnail selected by the dragged image selector.

The second determining unit 602 is configured to determine, after receiving a confirm command input by the user in response to the preview image, a picture corresponding to the thumbnail, which is selected by the dragged image selector, as one of the multiple frames of images for making the dynamic emoticon.

The video acquiring module 301 shown in any one of FIG. 3 to FIG. 6 may include a first acquiring unit 701, a downloading unit 702, or a second acquiring unit 703, as shown in the apparatus for making a personalized dynamic emoticon provided in any one of FIG. 7-*a* to FIG. 7-*d*.

The first acquiring unit 701 is configured to acquire the video from a video file already saved in a local folder.

The downloading unit 702 is configured to download the video from a server or a carrier.

The second acquiring unit 703 is configured to acquire the video by shooting a real-time video of a real object with an image shooting device.

An embodiment of the present invention further provides another intelligent terminal, as shown in FIG. 8; the intelligent terminal includes: a system bus 801, and a communications interface 803, a display screen 804, and an input/output (I/O) interface 805 that are connected to the system bus 801, where a processor 806 and a memory 807 are connected to the I/O interface 805; in addition, the intelligent terminal further includes an input device and another output device apart from the display screen 804.

The communications interface 803 is configured to communicate with other devices, the memory 807 is configured store a program 808 for executing the foregoing method for making a personalized dynamic emoticon, and the processor 806 executes the program 808 so as to:

acquire a video;

receive a picture selection instruction input from a UI for making dynamic emoticons;

determine, from the acquired video according to the picture selection instruction, multiple frames of images for making a dynamic emoticon; and synthesize the multiple frames of images for making the dynamic emoticon, to form a picture having a dynamic effect.

Optionally, the processor 806 executing the program 808 to determine, from the acquired video according to the picture selection instruction, multiple frames of images for making a dynamic emoticon includes:

reducing each frame of image in the video to be a thumbnail, and sequentially arranging the thumbnails in a thumbnail box;

setting the quantity of the multiple frames of images; and distributing, on the thumbnail box, multiple image selectors whose quantity is equal to the set quantity, and determining pictures corresponding to all thumbnails, which are selected by the multiple image selectors, as the multiple frames of images for making the dynamic emoticon.

Optionally, before the processor 806 executes the program 808 to distribute, on the thumbnail box, multiple image selectors whose quantity is equal to the set quantity, and determine pictures corresponding to all thumbnails, which are selected by the multiple image selectors, as the multiple frames of images for making the dynamic emoticon, the processor 806 further executes the program 808 to:

display, on a preview box when navigating to any image selector of the multiple image selectors distributed on the thumbnail box, a preview image corresponding to a thumbnail selected by the image selector.

Optionally, the processor 806 executing the program 808 to distribute, on the thumbnail box, multiple image selectors whose quantity is equal to the set quantity, and determine pictures corresponding to all thumbnails, which are selected by the multiple image selectors, as the multiple frames of images for making the dynamic emoticon includes:

displaying, on a preview box when any image selector of the multiple image selectors is dragged to any thumbnail in the thumbnail box, a preview image corresponding to the thumbnail selected by the dragged image selector; and determining, after receiving a confirm command input by a user in response to the preview image, a picture corresponding to the thumbnail, which is selected by the dragged image selector, as one of the multiple frames of images for making the dynamic emoticon.

Optionally, the processor 806 executing the program 808 to acquire a video includes:

acquiring the video from a video file already saved in a local folder;

downloading the video from a server or a carrier; or acquiring the video by shooting a real-time video of a real object with an image shooting device.

In the embodiments provided in the present application, it should be noted that, the disclosed method and apparatus may be implemented in other manners. For example, the described apparatus embodiment is merely exemplary. For example, the division of the units is merely a division of logic functions, and other division manners may be used in actual implementation. For example, a plurality of units or components may be combined or integrated into another system, or some features may be ignored or not performed. In addition, the displayed or discussed mutual couplings or direct couplings or communication connections may be implemented through some interfaces. Indirect couplings or communication connections between apparatuses or units may be implemented in electronic, mechanical, or other forms.

The units described as separate parts may or may not be physically separate; parts displayed as units may or may not be physical units, which may be located at one position, or distributed over multiple network units. Some or all of the units may be selected according to actual needs to achieve the objective of the solution of this embodiment.

In addition, the functional units in the embodiments of the present invention may be integrated into one processing unit, or each unit may exist as an independent physical unit, or two or more units may be integrated into one unit. The integrated unit may be implemented in the form of hardware or in the form of hardware and software functional units.

The integrated unit implemented in the form of the software functional unit may be stored in a computer readable storage medium. The software functional unit is stored in a storage medium, and includes several instructions to cause a computer device (which may be a PC, a server, a network device, or the like) to execute some steps of the method in the embodiments of the present invention. The foregoing storage medium includes various media capable of storing program codes, such as, a USB flash drive, a mobile hard disk, a Read Only Memory (ROM), a Random Access Memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for making a personalized dynamic emoticon, comprising:

acquiring, by a processor, a video;

receiving, by the processor, a picture selection instruction input from a user interface (UI) for making dynamic emoticons;

determining, by the processor from the acquired video according to the picture selection instruction, multiple frames of images for making a dynamic emoticon; and synthesizing, by the processor, the multiple frames of images for making the dynamic emoticon, to form a picture having a dynamic effect, wherein the determining, by the processor from the acquired video according to the picture selection instruction, multiple frames of images for making a dynamic emoticon comprises:

reducing each frame of image in the video to be a thumbnail, and sequentially arranging the thumbnails in a thumbnail box;

receiving a quantity of the multiple frames of images for making the dynamic emoticon, set by a user;

in response to receiving the set quantity, distributing, on the thumbnail box, multiple image selectors in a same interval, wherein the quantity of the multiple image selectors is equal to the set quantity;

in response to receiving a dragging signal formed by dragging the multiple image selectors to multiple thumbnails in the thumbnail box, re-distributing the multiple image selectors to overlap the multiple thumbnails, respectively; and determining pictures corresponding to the multiple thumbnails on which the multiple image selectors are distributed, as the multiple frames of images for making the dynamic emoticon.

2. The method according to claim 1, wherein re-distributing the multiple image selectors to overlap the multiple thumbnails respectively comprises:

displaying, on a preview box when navigating to any image selector of the multiple image selectors distributed on the thumbnail box, a preview image corresponding to a thumbnail selected by the image selector.

3. The method according to claim 1, wherein re-distributing the multiple image selectors to overlap the multiple thumbnails respectively and determining pictures corresponding to the multiple thumbnails on which the multiple image selectors are located, as the multiple frames of images for making the dynamic emoticon comprises:

displaying, on a preview box when any image selector of the multiple image selectors is dragged to any thumbnail in the thumbnail box, a preview image corresponding to the thumbnail selected by the dragged image selector; and determining, after receiving a confirm command input by a user in response to the preview image, a picture corresponding to the thumbnail, which is selected by the dragged image selector, as one of the multiple frames of images for making the dynamic emoticon.

4. The method according to claim 1, wherein a manner for acquiring the video comprises one or more of the following:
acquiring the video from a video file already saved in a local folder;
downloading the video from a server or a carrier; and
acquiring the video by shooting a real-time video of a real object with an image shooting device.

5. An apparatus for making a personalized dynamic emoticon, comprising a processor and a non-transitory computer readable medium having a plurality of computer readable instructions stored thereon that, when executed by the processor, cause the processor to:
acquire a video;
receive a picture selection instruction input from a user interface (UI) for making dynamic emoticons;
determine, from the acquired video according to the picture selection instruction, multiple frames of images for making a dynamic emoticon; and
synthesize the multiple frames of images for making the dynamic emoticon, to form a picture having a dynamic effect,
wherein determining, from the acquired video according to the picture selection instruction, multiple frames of images for making a dynamic emoticon comprises:
reducing each frame of image in the video to be a thumbnail, and sequentially arranging the thumbnails in a thumbnail box;
receiving a quantity of the multiple frames of images for making the dynamic emoticon, set by a user;
in response to receiving the set quantity, distributing, on the thumbnail box, multiple image selectors in a same interval, wherein the quantity of the multiple image selectors is equal to the set quantity;
in response to receiving a dragging signal formed by dragging the multiple image selectors to multiple thumbnails in the thumbnail box, re-distributing the multiple image selectors to overlap the multiple thumbnails, respectively; and
determining pictures corresponding to the multiple thumbnails on which the multiple image selectors are located, as the multiple frames of images for making the dynamic emoticon.

6. The apparatus according to claim 5, wherein the computer readable instructions further cause the processor to:
display, on a preview box when navigating to any image selector of the multiple image selectors distributed on the thumbnail box, a preview image corresponding to a thumbnail selected by the image selector.

7. The apparatus according to claim 5, wherein re-distributing the multiple image selectors to overlap the multiple thumbnails respectively and determining pictures corresponding to the multiple thumbnails on which the multiple image selectors are located, as the multiple frames of images for making the dynamic emoticon comprises:
displaying, on a preview box when any image selector of the multiple image selectors is dragged to any thumbnail in the thumbnail box, a preview image corresponding to the thumbnail selected by the dragged image selector; and
determining, after receiving a confirm command input by a user in response to the preview image, a picture corresponding to the thumbnail, which is selected by the dragged image selector, as one of the multiple frames of images for making the dynamic emoticon.

8. The apparatus according to claim 5, wherein acquiring the video comprises one or more of the following steps:
acquiring the video from a video file already saved in a local folder; or
downloading the video from a server or a carrier; or
acquiring the video by shooting a real-time video of a real object with an image shooting device.

9. A non-transitory computer readable storage medium having stored therein one or more instructions, which, when executed by a terminal, causes the terminal to:
acquire a video;
receive a picture selection instruction input from a user interface (UI) for making dynamic emoticons;
determine, from the acquired video according to the picture selection instruction, multiple frames of images for making a dynamic emoticon; and
synthesize the multiple frames of images for making the dynamic emoticon, to form a picture having a dynamic effect,
wherein determining, from the acquired video according to the picture selection instruction, multiple frames of images for making a dynamic emoticon comprises:
reducing each frame of image in the video to be a thumbnail, and sequentially arranging the thumbnails in a thumbnail box;
receiving a quantity of the multiple frames of images for making the dynamic emoticon, set by a user;
in response to receiving the set quantity, distributing, on the thumbnail box, multiple image selectors in a same interval, wherein the quantity of the multiple image selectors is equal to the set quantity;
in response to receiving a dragging signal formed by dragging the multiple image selectors to multiple thumbnails in the thumbnail box, re-distributing the multiple image selectors to overlap the multiple thumbnails, respectively; and
determining pictures corresponding to the multiple thumbnails on which the multiple image selectors are located, as the multiple frames of images for making the dynamic emoticon.

10. The computer readable storage medium according to claim 9, wherein re-distributing the multiple image selectors to overlap the multiple thumbnails respectively comprises:
displaying, on a preview box when navigating to any image selector of the multiple image selectors distributed on the thumbnail box, a preview image corresponding to a thumbnail selected by the image selector.

11. The computer readable storage medium according to claim 9, wherein re-distributing the multiple image selectors to overlap the multiple thumbnails respectively and determining pictures corresponding to the multiple thumbnails on which the multiple image selectors are located, as the multiple frames of images for making the dynamic emoticon comprises:
displaying, on a preview box when any image selector of the multiple image selectors is dragged to any thumbnail in the thumbnail box, a preview image corresponding to the thumbnail selected by the dragged image selector; and
determining, after receiving a confirm command input by a user in response to the preview image, a picture corresponding to the thumbnail, which is selected by the dragged image selector, as one of the multiple frames of images for making the dynamic emoticon.

12. The computer readable storage medium according to claim 9, wherein a manner for acquiring the video comprises one or more of the following:

acquiring the video from a video file already saved in a local folder;
downloading the video from a server or a carrier; and
acquiring the video by shooting a real-time video of a real object with an image shooting device.

* * * * *